3,269,895
CONTROL OF NEMATODES WITH
ARSINE OXIDES
Arthur Schwerdle, Vineland, N.J., assignor to Vineland Chemical Company, Vineland, N.J., a partnership composed of Arthur Schwerdle and Miriam Schwerdle
No Drawing. Filed Aug. 10, 1964, Ser. No. 388,696
3 Claims. (Cl. 167—22)

The present invention relates to a novel method for the control of nematodes in the soil.

As is well known, nematodes, which live in soil, cause much damage to plants growing in the soil. Many plant ailments, including "citrus decline" in citrus trees, root rot in cotton and root knot disease in tomatoes, are caused by nematodes. Nematodes attack the roots of plants boring into the tissues thereof to extract plant juices as food. This not only weakens the plant but provides openings through which other pathogenic organisms, especially fungi and bacteria, can gain access and cause infection.

It is the principal object of the present invention to provide a novel method for controlling nematodes in the soil.

Other objects will become apparent from a consideration of the following specification and the claims.

The method of the present invention comprises applying, to soil containing nematodes, an aqueous solution of at least one organic arsine oxide selected from the group consisting of alkyl arsine oxides containing from 1 to 6 carbon atoms and phenyl arsine oxide in an amount toxic to the nematodes.

It has been found that the stated arsine oxides are effective in the soil against nematodes therein at rates of application which can be well below the level at which the arsine oxides are phytotoxic toward desirable plants which may be growing in the soil. It has been found that the arsine oxides do not become inactivated by materials in the soil at least until they have exerted their effect on the nematode organism. Thus, the stated arsine oxides are able, in effect, to greatly reduce or extinguish the ability of the treated soil to propagate or harbor the harmful nematodes and to serve as a repository in which the nematodes may flourish and from which the nematodes may attach the roots of plants growing therein.

The arsine oxides employed in accordance with the present invention include phenyl arsine oxide and the alkyl arsine oxides containing from one to six carbon atoms; that is, the methyl-, ethyl-, propyl-, butyl-, amyl- and hexyl arsine oxides. Combinations of two or more of these arsine oxides may be used, and where rate and concentration ranges are set forth herein, they include total content of the arsine oxide compounds where such combinations are used. Methyl arsine oxide is freely soluble in water even at high dilutions. The higher arsine oxides are increasingly less soluble as the molecular weight thereof increases. However, these may be dispersed in a limited amount of water using conventional emulsifying agents and the resulting concentrate can be diluted with water to provide the desired ultimate solution for application. Suitable emulsifying agents in this regard are the polyoxyethylene sorbitan fatty acid esters, such as polyoxyethylene sorbitan monolaurate, polyoxyethylene sorbitan monopalamitate, polyoxyethylene sorbitan monostearate, polyoxyethylene sorbitan tristearate, polyoxyethylene sorbitan monoleate, polyoxyethylene sorbitan trioleate, and the like.

The rate of application presently found to be suitable range from about 10 to about 100 pounds of the stated arsine oxides per acre. If desirable plants are present in the soil being treated, it is preferable that the solution, especially at the higher rates, be applied at ground level or below to avoid contact with the plant foliage.

As stated, the arsine oxides will be applied as an aqueous solution thereof. The water in the solution is primarily a vehicle to aid in the easy dispersal of the compound or compounds over the area and to the soil at the desired rate. Once the arsine oxide compound is applied to the soil, distribution of the compound into the soil will depend upon water content of the soil at the time of application, water subsequently applied to the treated soil (rain or after-watering) and natural diffusion of the compound, by virtue of the nature of the soil, in vapor—or liquid phase depending upon the nature of the particular compound used. Hence, as far as the application of the compound to the soil is concerned, the concentration of arsine oxide compound in the solution applied is not critical and may vary over a wide range depending upon the particular method of application and convenience to the user.

The principal object to be achieved is to provide a concentration of arsine oxide compound in the soil water which is effective against the nematodes therein. The presently known minimum concentration is about 100 p.p.m. (100 parts of arsine oxide compound per million parts of water in the soil). The upper limit may go as high as about 1000 p.p.m. As an illustration, taking a soil that contains 10%, by weight, of water and applying the arsine oxide compound at a rate of 20 pounds per acre, results in a concentration of arsine oxide compound in the soil water of about 160 p.p.m., assuming the arsine oxide compound penetrates to about 6 inches into the soil. Because of the amount of soil water involved, the amount of water added with the arsine oxide compound is negligible. It will be realized that the concentration of arsine oxide compound will not be uniform throughout the entire area or throughout the entire depth of penetration, and that the concentration is probably higher nearer the surface where, in any event, most of the nematodes will be found. The concentration figures given above, therefore, are average, and may be considered as representing the average concentration in the first 6 inches of soil whether or not the arsine oxide compound has actually penetrated to that depth.

While the arsine oxide compound may be the only active ingredient present in the solution applied, it will be obvious that various adjuvants, like wetting agents, stabilizers, plant nutrients, other pesticides and the like, may be included if desired.

As illustrative of the effect of the various arsine oxide compounds against nematodes, the following compounds were tested against *Panagrellus redivius*, the "sour paste" nematode: (A) methyl arsine oxide; (B) ethyl arsine oxide (twice, B-1 and B-2); (C) n-propyl arsine oxide; (D) n-butyl arsine oxide (twice, D-1 and D-2); (E) n-amyl arsine oxide and (F) phenyl arsine oxide.

In each test, groups of ten pre-adult or young adult nematodes each were placed in separate dishes. Each compound was tested at concentration levels (in water) of 100, 500 and 1000 p.p.m., and each test compound was replicated three times. Checks consisted of 100 p.p.m. solutions of polyoxyethylene sorbitan monolaurate. The percentage of nematodes remaining alive after 4, 24 and 48 hours of contact, respectively, was then determined.

The results are tabulated as follows in which each percentage figure is the average of the three replicates for each test, except for the checks which figures represent a range of averages from many tests:

| Test Compound | Conc. (p.p.m.) | Percentage of Nematodes Alive After— | | |
|---|---|---|---|---|
| | | 4 hours | 24 hours | 48 hours |
| Check | | 100 | 90–100 | 93–100 |
| A | 100 | 57 | 23 | 13 |
|  | 500 | 20 | 10 | 0 |
|  | 1,000 | 7 | 0 | 0 |
| B-1 | 100 | 77 | 50 | 0 |
|  | 500 | 23 | 0 | 0 |
|  | 1,000 | 13 | 0 | 0 |
| B-2 | 100 | 23 | 3 | 0 |
|  | 500 | 7 | 0 | 0 |
|  | 1,000 | 10 | 0 | 0 |
| C | 100 | 50 | 17 | 0 |
|  | 500 | 20 | 0 | 0 |
|  | 1,000 | 3 | 0 | 0 |
| D-1 | 100 | 43 | 0 | 0 |
|  | 500 | 53 | 0 | 0 |
|  | 1,000 | 30 | 0 | 0 |
| D-2 | 100 | 47 | 10 | 0 |
|  | 500 | 20 | 10 | 0 |
|  | 1,000 | 7 | 0 | 0 |
| E | 100 | 13 | 0 | 0 |
|  | 500 | 0 | 0 | 0 |
|  | 1,000 | 0 | 0 | 0 |
| F | 100 | 10 | 0 | 0 |
|  | 500 | 0 | 0 | 0 |
|  | 1,000 | 0 | 0 | 0 |

Modification is possible in the techniques of application without departing from the scope of the invention.

I claim:

1. The method of controlling nematodes which comprises applying to soil containing nematodes an aqueous solution of at least one arsine oxide compound selected from the group consisting of alkyl arsine oxides containing from one to six carbon atoms and phenyl arsine oxide in an amount toxic to the nematodes.

2. The method of claim 1 wherein the arsine oxide compound is applied at a rate of between about 10 and about 100 pounds per acre.

3. The method of claim 1 wherein the arsine oxide compound is applied at a rate to provide, in the first six inches of soil, an average concentration of arsine oxide compound in the soil water of between 100 and about 1000 parts per million.

References Cited by the Examiner

UNITED STATES PATENTS

| | | | |
|---|---|---|---|
| 1,565,237 | 12/1925 | Schmidt et al. | 167—15 |
| 1,652,291 | 12/1927 | Tanner | 167—41 |
| 2,396,258 | 3/1946 | Friedheim | 260—440 |
| 2,678,265 | 5/1954 | Schwerdle | 71—2.7 |
| 2,967,799 | 1/1961 | Wehner | 167—30 |
| 3,056,668 | 10/1962 | Sprague | 71—2.1 |
| 3,147,295 | 9/1964 | Laughlin | 260—440 |

LEWIS GOTTS, *Primary Examiner.*

SHEP K. ROSE, *Assistant Examiner.*